United States Patent
England et al.

(10) Patent No.: US 7,418,512 B2
(45) Date of Patent: Aug. 26, 2008

(54) SECURELY IDENTIFYING AN EXECUTABLE TO A TRUST-DETERMINING ENTITY

(75) Inventors: Paul England, Bellevue, WA (US); Anshul Dhir, Redmond, WA (US); Thekkthalackal Varugis Kurien, Sammamish, WA (US); Kenneth D. Ray, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 895 days.

(21) Appl. No.: 10/692,224

(22) Filed: Oct. 23, 2003

(65) Prior Publication Data

US 2005/0125548 A1 Jun. 9, 2005

(51) Int. Cl.
*G06F 15/16* (2006.01)

(52) U.S. Cl. .................. 709/229; 709/227; 709/228; 705/56; 705/58

(58) Field of Classification Search ......... 715/741–743; 380/277–279; 726/1–33; 709/227–229; 713/168
See application file for complete search history.

(56) References Cited

U.S. PATENT DOCUMENTS

| | | | | |
|---|---|---|---|---|
| 5,991,399 | A | 11/1999 | Graunke et al. | 380/4 |
| 7,171,558 | B1 * | 1/2007 | Mourad et al. | 713/168 |
| 7,174,320 | B2 * | 2/2007 | Rothrock | 705/58 |
| 2003/0191944 | A1 | 10/2003 | Rothrock | 713/182 |

FOREIGN PATENT DOCUMENTS

| | | |
|---|---|---|
| EP | 1 191 422 A2 | 3/2002 |
| WO | WO 03/065630 A2 | 8/2003 |

* cited by examiner

*Primary Examiner*—Yves Dalencourt
*Assistant Examiner*—Michael C Lai
(74) *Attorney, Agent, or Firm*—Woodcock Washburn LLP

(57) ABSTRACT

A resource is obtained from a resource provider (RP) for a resource requester (RR) operating on a computing device. The RR has an identity descriptor (id) associated therewith, where the id including security-related information specifying an environment in which the RR operates. A code identity (code-ID) is calculated corresponding to and based on the loaded RR and loaded id. The RP verifies that the calculated code-ID in a request for the resource matches one of one or more valid code-IDs for the identified RR to conclude that the RR and id can be trusted, and the RP responds to the forwarded request by providing the requested resource to the RR.

36 Claims, 4 Drawing Sheets

SECURELY IDENTIFYING AN EXECUTABLE TO A TRUST-DETERMINING ENTITY

TECHNICAL FIELD

The present invention relates to a method and mechanism by which an executable or the like can securely identify itself to a trust-determining entity such as may wish to provide a resource to the executable. More specifically, the present invention relates to such a method and mechanism whereby the trust-determining entity can authenticate the executable prior to providing the resource thereto.

BACKGROUND OF THE INVENTION

In many computer scenarios, a first computer-type entity provides some sort of computer-type resource to a second computer-type entity. As may be appreciated, each of the first and second entities may be a hardware or software entity, such as a computer program or executable, a computer storage device, a computer data server, or the like. Likewise, the resource may be raw data, a file with the raw data therein in some organized fashion, or the like.

Especially in the case where the resource is of especial value or is to be handled in accordance with pre-defined rules, the first entity or 'resource provider' may only provide the resource to the second entity or 'resource recipient' if the second entity or an associated entity proffers authentication information to the first entity and the first entity authenticates the second entity based thereon. For example, if a server at a banking institution (the first entity) is providing a security key (the resource) to a banking program at a user's computer (the second entity) by which the user can conduct banking transactions at the computer, the server may demand to have some assurance that the banking program can be trusted to employ the security key in a manner amenable to the bank.

That is, the server wants authentication information either from the banking program itself or an authenticator on behalf of the banking program that the banking program is of a certain type, running in a certain environment based on certain variables, and/or the like. Thus, the server in fact provides the security key to the banking program only after authenticating same based on the provided authentication information. Of particular importance, the server in authenticating the banking program based on the authentication information wishes to ensure that the banking program has not been altered in a way such as for example to misuse the security key, and also wishes to ensure that the banking program is operating is not operating in an environment where the security key can be diverted to or read by a questionable entity such as a thief.

A need exists, then, for a method and mechanism by which a computer program, executable, or other resource recipient can be provided with authentication information by which the resource recipient can be authenticated by a resource provider that is to provide a resource thereto. In particular, a need exists for an identity descriptor for describing the identity of the resource recipient to the resource provider, where the identity descriptor includes among other things a set of variables that describe the environment of the resource recipient and an authenticating signature or the like.

SUMMARY OF THE INVENTION

The aforementioned needs are satisfied at least in part by the present invention in which a resource is obtained from a resource provider (RP) for a resource requester (RR) operating on a computing device. The RR has an identity descriptor (id) associated therewith, where the id including security-related information specifying an environment in which the RR operates.

The RR and the id corresponding to the RR are loaded onto the computing device, and the RR is provided with a reference to the loaded id. A code identity (code-ID) is calculated corresponding to and based on the loaded RR and loaded id. Upon receiving a request from the RR for the resource, it is ascertained that the requesting RR has rights to the resource and is to be trusted with the resource. Thereafter, the request for the resource is forwarded from the RR to the RP.

The RP verifies the received request, obtains the code-ID, the id, and the definition of the resource requested from the received request, and determines from the received request an identity of the requesting RR. Also, the RP obtains each of one or more valid code-IDs for the identified RR, and verifies that the calculated code-ID in the received request matches one of the valid code-IDs for the identified RR. The RP can then conclude that the RR can be trusted as being a known RR that can be presumed to be trustworthy, and also that the security-related information upon which the RR operates is known security-related information that can be presumed to be trustworthy.

Thereafter, the RP responds to the forwarded request by providing the requested resource to the RR. The RR receives the requested resource as provided by the RP and employs same in a manner consistent with the trust imparted to the RR by the RP, and in accordance with the security-related information set forth in the id corresponding to the RR.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
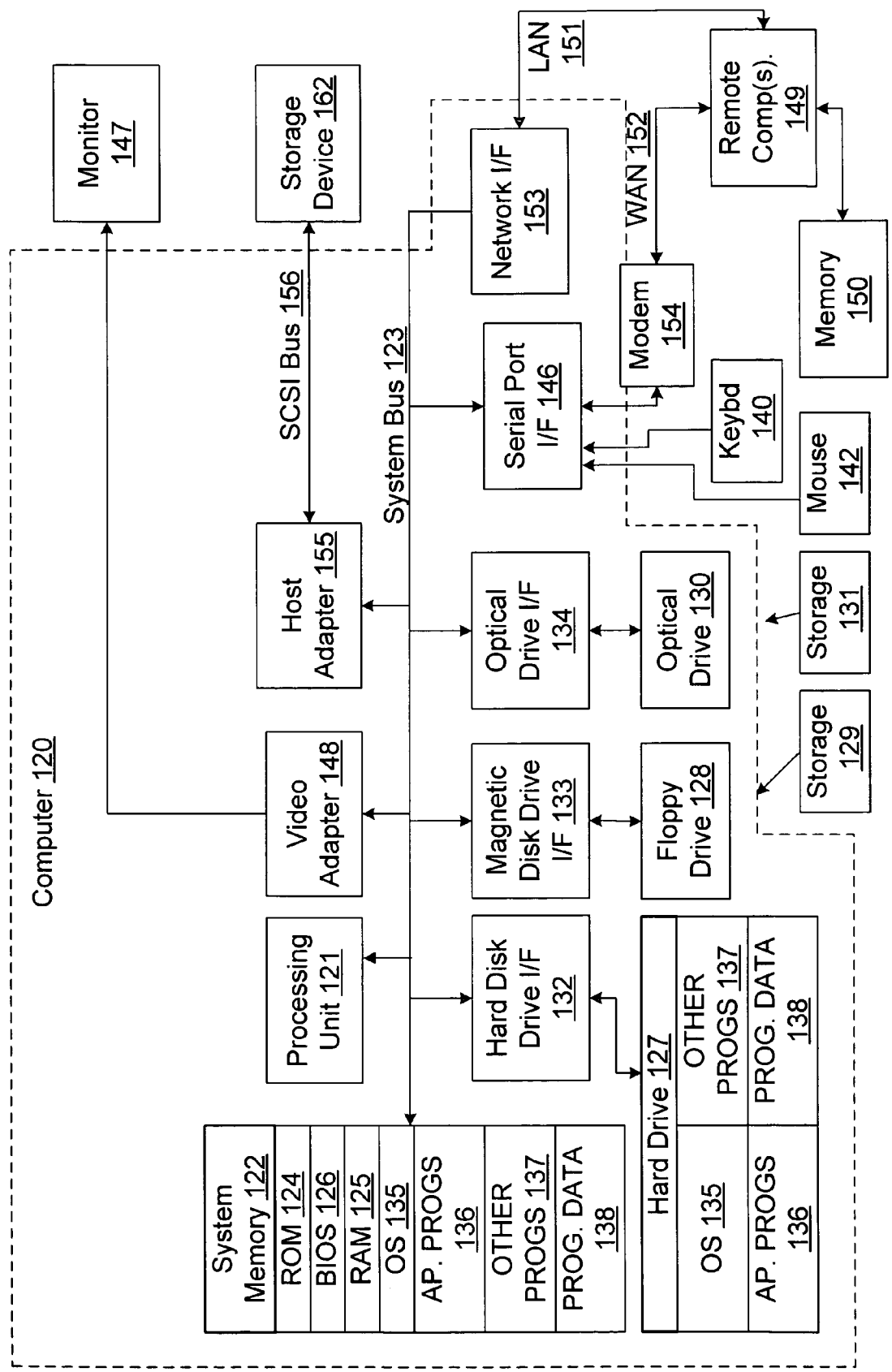
FIG. 1 is a block diagram showing an enforcement architecture of an example of a trust-based system.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Identity Descriptor for Resource Recipient

Figure 2:
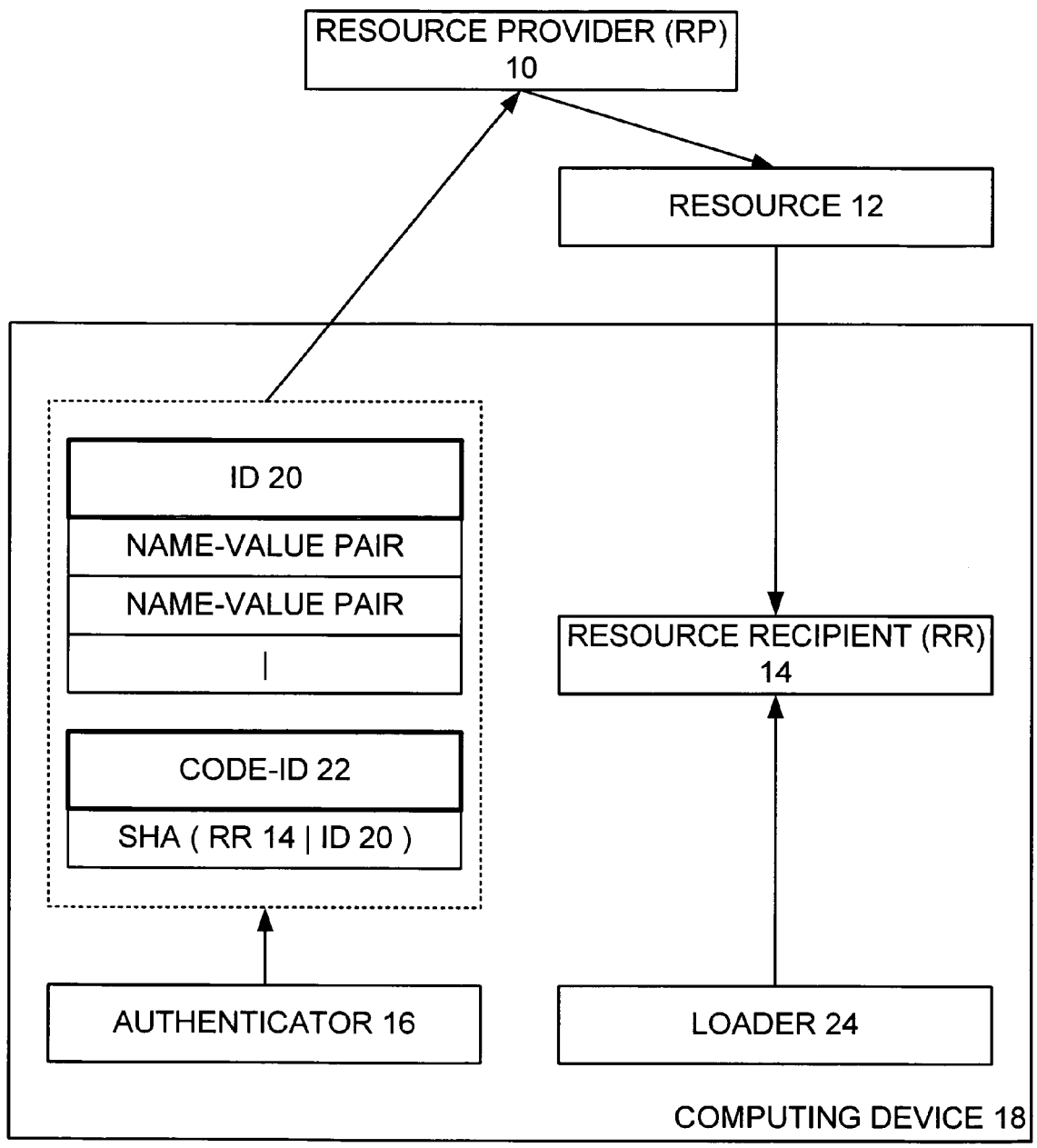
FIG. 2 is a block diagram showing a resource requester, a resource recipient, an identity descriptor of the resource recipient, and related entities arranged in and operating in accordance with one embodiment of the present invention.

Turning now to FIG. 2, it is seen that the present invention is set forth in the context of a first computer-type entity acting as a resource provider (RP) 10 providing some sort of computer-type resource 12 to a resource recipient (RR) 14. As may be appreciated, depending on the circumstances of any given situation, each of RP 10 and RR 14 may be a hardware or software entity, or may be a hardware element of a software entity or a software element of a hardware entity, all without departing from the spirit and scope of the present invention. For example, RP 10 may be a server providing data, a file, a key, content, or the like as the resource 12, and RR 14 may be a software construct, a data storage device, a computer program, or the like with a need for such resource. Likewise, RP 10 may be a printer, a network, or the like, and RR 14 may be a program or other construct seeking as the resource access to such RP 10.

In one embodiment of the present invention, the resource 12 is of especial value or is to be handled in accordance with pre-defined rules, and accordingly the RP 10 only provides same to the RR 14 if the RR 14 or an associated authenticator 16 proffers authentication information to the RP 10 and the RP 10 authenticates the RR 14 based thereon. The RR and the authenticator 16 may for example both reside on a computing device 18 of a user, where the authenticator 16 is a trust evaluator or is some other system entity on the computing device 18 such as a loader or other part of an operating system on the computing device 18.

In the prior art, the RR 14 typically included a manifest with information relevant to the RR 14, including items such as a description of the environment inside the process of the RR 14, a digital signature with a verifying certificate chain, keys that can be employed to verify constituent elements of the RR 14, and the like. In operation, then, elements operating on the computing device 18 referred to the associated manifest for example to obtain a key to verify the RR 14, or to determine that the process of the RR 14 should in fact include certain constituent elements, or to obtain certain procedures that must be followed in the course of operation, or the like.

Thus, the manifest of the RR 14 described the RR 14, the security environment of the RR 14, the inputs to the RR 14, and the like. However, such manifest is deficient in that:

1) The manifest could specify multiple executables that could be loaded into a single process. Although allowing for more flexibility, limiting the manifest to a single executable is more secure in that the one manifest can be concatenated or otherwise combined with the one executable and a single code identity or 'code-ID' can be calculated based on such one combination. As may be appreciated, a code-ID is a digest of the combination, and in particular of the security-relevant input as set forth in the manifest and the executable itself. As will be set forth in more detail below, the identity descriptor or 'id' of the present invention is a data structure that comprises such security-relevant input.

2) The manifest has grown to include multiple features that result in increased complexity and other undesirable effects. In contrast, the id of the present invention can be incorporated directly into the manifest, imported by reference from elsewhere, or derived at run-time from the manifest and/or elsewhere, that is specifically directed to the aforementioned security-relevant inputs to the corresponding executable only, and that has security relevance at the lowest level of the access control system. Thus, the id can have a relatively simple format.

Turning now specifically to the identity descriptor or id of the present invention, the id 20 is a package for the security-relevant input to an executable in a process, where the executable is presumptively the RR 14 of FIG. 2. As may be appreciated, the id 20 may be embedded in the executable, be derived from a separate file, or be extracted from another document such as for example a manifest. Essentially, the id 20 is an environmental block specifying input variables that describe the environment in which the executable/RR 14 (hereinafter, 'RR 14') operates, and especially the security environment, and can be used by the RR 14 and the operating system of the computing device 18 on which the RR 14 resides to control launching and execution of such RR 14, and can also be used by the RP 10 when deciding whether to provide a resource 12 to such RR 14. A code identity or 'code-ID' 22 is derived or calculated from a digest of the RR 14 and the id 20 and is typically a hash of same in a manner akin to that which is employed in a digital signature.

Significantly, if the RR 14 wishes to modify its security environment such as for example by reading in a file, opening a debugging port, and the like, such RR 14 is itself responsible for doing so. However, if the developer developing the RR 14 wishes to have a particular behavior parameterized, and the parameter has security implications (e.g. open a different file based on program input, or debug based on program input) then the parameter can be placed in the id 20 and the RR 14 can be written to refer only to the id 20 for the parameter. Thus, although the parameter could potentially be modified within the id 20 by a nefarious entity, the modified id 20 will cause the calculated code-ID 20 to change, where such change can be interpreted by an interested party such as an RP 10 as an indication that the RR 14 should not be trusted.

In one embodiment of the present invention, the id 20 has the functional form:

Map<NameString, String>EnvironmentVariables

That is, the id 20 includes therein a set of name-value pairs, each of which maps a name such as for example a dotted alphanumeric string to a corresponding value string. Note that the id 20 could be in the form of an XML document or the like without departing from the spirit and scope of the present invention, although such XML may unnecessarily introduce parsing complexity. Note, too, that at least some of the variables could be XML documents expressed as strings. Thus, the id 20 represented as a list is of the form:

Name1=StringValue1
Name2=StringValue2
Name3=StringValue3

Examples of uses of the id 20 are as follows. Note that the examples are illustrative and not necessarily all-encompassing. Assuming a dotted namespace for the "names," the "_System" namespace could be reserved for use by the operating system of the computing device 18, and an id 20 of an RR 14 could include therein:

_System.Debuggable="true"
_System.ProgramName="Excel"
_System.SealToLocalAdmin="true"

Thus, the operating system of the computing device 18 could refer to the id 20 to determine that the process of the RR 14 corresponding to the id 20 is debuggable, that the executable is named 'Excel', and that the variable _System.SealToLocalAdmin has been set to "true".

An RR 14 can employ the id 20 thereof to make behavioral decisions based on program inputs of a security nature. Assuming a dotted namespace for the "names," the "MyProg" namespace could be reserved for use by the RR 14, and an id 20 of an RR 14 could include therein:

MyProg.ProgName="MS URT running Trusted Backup Script"
MyProg.script="main( ){foreach(blob in blobs)printf(blob);}"
MyProg.UI="<xml>Some UI XML</xml>";
MyProg.AllowedResourceFiles="0x1234, 0x3456, 0x89abb";
MyProg.KeyHolderWhoCanDebugMyProcess="0xfedcb";

Thus, the, the RR 14 can determine based on the id 20 thereof a particular program name, a program script, a program UI (user interface) in XML format, a number of allowed resource files, and a particular key holder that can debug the process of the RR 14.

As should be appreciated, the actual name-value pairs in any particular id 20 may be any appropriate name-value pairs without departing from the spirit and scope of the present invention. Moreover, such name-value pairs could include types of values that vary from RR 14 to RR 14, such as for example a particular program script or list of valid users, and also types of values that are common to most all RRs 14, such as for example a program name and whether the process of the RR 14 is debuggable. Typically, the name-value pairs in any particular id 20 are security-related, inasmuch as the id 20 is primarily an environmental block specifying input variables that describe the security environment of the operating RR14, although it is to be appreciated that non-security-related name-value pairs may also be in the id 20 without departing from the spirit and scope of the present invention.

Thus, and especially with regard to security-related matters, a particular id 20 may include name-value pairs that describe the operating system, virtual machine, actual machine, and/or the like of the computing device 18 upon which the RR 14 is to operate, whether the RR 14 is to be operated in an isolated process that cannot be monitored by a debugger or the like or is to be operated in a debuggable process that can in fact be so monitored, each entry point by which the RR 14 can be accessed, and security-related inputs that are provided to the RR 14, among other security-related matters. As should be appreciated, such security-related matters in general are matters that affect how the RR 14 operates, where the RR 14 gets data and other inputs, and whether the RR 14 can be externally affected or monitored, among other things. Accordingly, and also in general, the information in the id 20 describes the RR 14, describes the operating system and computing device 18 upon which the RR 14 is to operate and describes security-related aspects of the RR 14. Note, though, that inasmuch as the code-ID 22 of the RR 14 is based in part on the id 20 thereof and that the code-ID 22 should be well-known, as will be set forth in more detail below, the id 20 should not include name-value pairs that are specific to any particular instantiation of the RR 14 on a particular computing device 18.

In one embodiment of the present invention, the code identity or 'code-ID' 22 corresponding to a particular RR 14 is defined as a hash of the RR 14 concatenated with the id 20 thereof. For example, the hash may be based on any of several known SHA algorithms, including SHA-1 and SHA-256:

Code-ID 22=SHA (RR 14|id20)

In one particular embodiment, the code-ID 22 is a concatenation of two of the aforementioned hashes, where one hash is based on SHA-1 and the other is based on SHA-256:

Code-ID 22=SHA-1 (RR 14|id20)|SHA-256 (RR 14|id 20)

Thus, and as should be appreciated, based on knowledge of the RR 14 and the id 20 thereof, and also on knowledge of the method by which the code-ID 22 is to be calculated, an RR 14 or an associated authenticator 16 may calculate a code-ID 22 corresponding to such RR 14 for presentation to an RP 10 in the manner of a digital signature. Significantly, each of one or more valid code-IDs 22 of an RR 14 should be well-known, especially by an RP 10 which is to be asked to provide a resource 12 to the RR 14. Note that an RR 14 may have more than one valid code-ID 22, especially if the RR 14 comes in multiple versions, is operable on multiple operating systems, etc., each of which necessitates a variation of the RR 14 and/or the id 20 thereof. Presumably, then, the RP 10 has knowledge of the RR 14 and each valid code-ID 22 for the RR 14, and such RP 10 provides the resource 12 to the RR 14 only if a valid code-ID 22 for the RR 14 is presented to the RP 10 on behalf of such RR 14.

Figure 3:
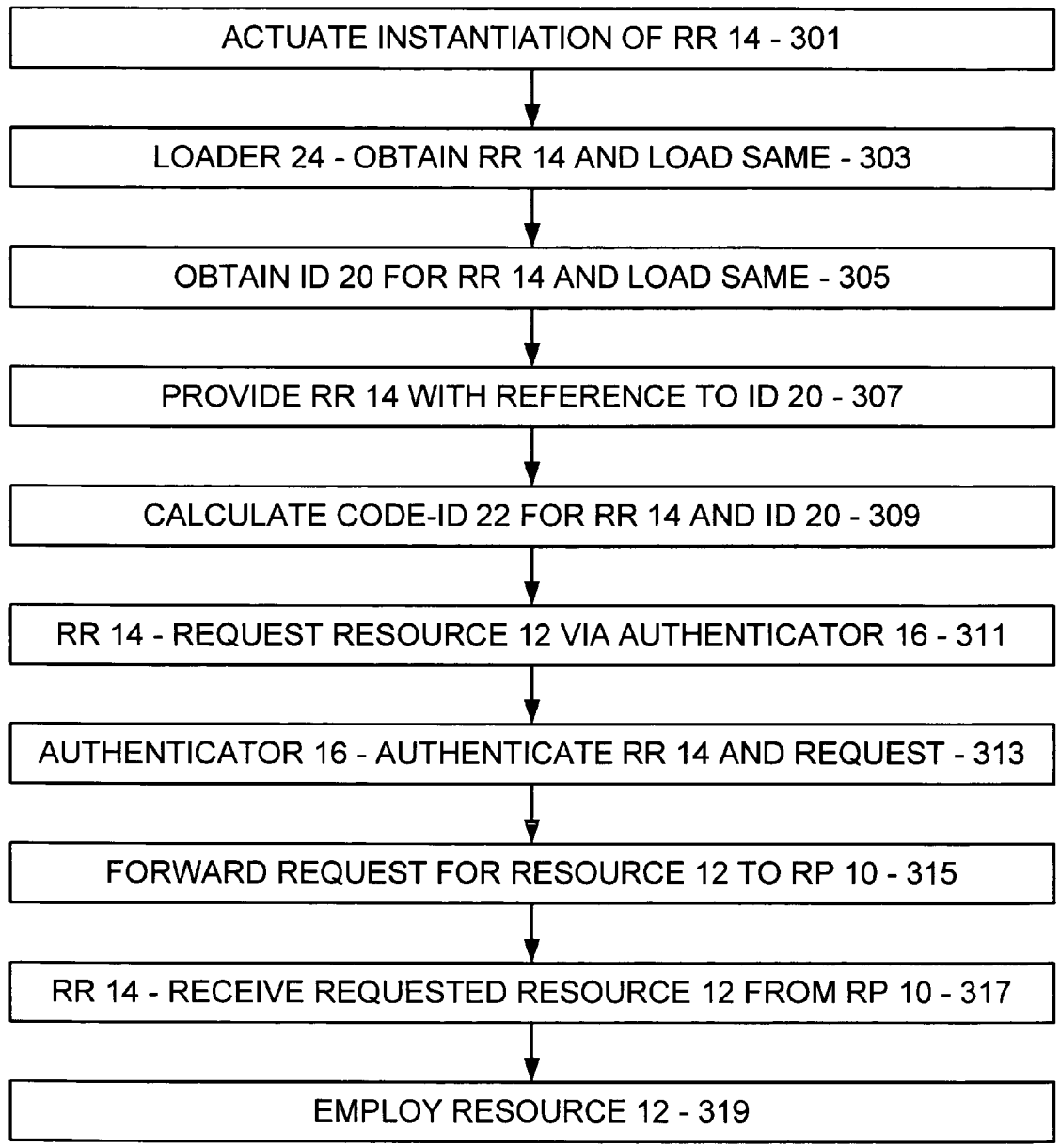
FIG. 3 is a flow diagram showing key steps performed by the resource recipient and related entities of FIG. 2 in requesting a resource from the resource provider of FIG. 2 in accordance with one embodiment of the present invention.

In one embodiment of the present invention, and turning now to FIG. 3, the id 20 and code-ID 22 corresponding to an RR 14 are employed in the following manner. Preliminarily, the RR 14 is caused to be instantiated in a process on the operating system of a computing device 18 by way of such instantiation being actuated by a user or by another process (step 301). Typically, such instantiation is achieved by way of a loader 24 operating on the operating system of the computing device 18, although such instantiation may be achieved by way of any other appropriate entity without departing from the spirit and scope of the present invention.

As part of instantiating the RR 14, the loader 24 obtains the RR 14 from wherever such RR 14 may be located and loads same (step 303). As should be understood, the loader 24 may perform such obtaining and loading of the RR 14 in any appropriate manner without departing from the spirit and scope of the present invention, where the specific method for obtaining is known or should be apparent to the relevant public and therefore need not be disclosed herein in any detail.

Also as part of instantiating the RR 14, the loader 24 obtains the id 20 corresponding to such RR 14 from wherever such id 20 may be located and also loads same in an appropriate location (step 305). As was set forth above, such id 20 may be embedded in the RR 14, be derived from a separate file, or be extracted from another document such as for example a manifest. At any rate, the loader 24 may obtain the id 20 from the location thereof in any appropriate manner without departing from the spirit and scope of the present invention in a mode corresponding to such location, where the specific method for obtaining is known or should be apparent to the relevant public and therefore need not be disclosed herein in any detail. The location where the loader loads the id 20 can be any appropriate location without departing from the spirit and scope of the present invention, such as for example a table, an id cache, the process of the RR 14, etc.

Note that the RR 14 and the operating system of the computing device 18 upon which the RR 14 operates can both require access to the loaded id 20. Accordingly, upon loading the id 20, the loader 24 provides at least the RR 14 with a pointer or other reference to the location of the id 20 (step 307). Thus, the RR 14 can find the security-related information relating thereto within such id 20. Moreover, the operating system can also find such security-related information, either by way of the RR 14 or by also receiving such a pointer or other reference.

Presumably, at some point during the operation of the RR 14, such RR 14 is going to require a resource 12 from an RP 10 which as was set forth above provides the resource 12 to such RR 14 only if a valid code-ID 22 for the RR 14 is presented to the RP 10 on behalf of such RR 14. Accordingly, upon loading the RR 14 and the corresponding id 20 thereof, a code-ID 22 corresponding to such loaded RR 14 and id 20 is calculated (step 309). Such code-ID 22 may be calculated by the loader 24 or by the aforementioned authenticator 16 that proffers authentication information to the RP 10. As maybe appreciated, the authenticator 16 may indeed be a part of the loader 24 or the loader 24 may indeed be a part of the authenticator 16. Again, the code-ID may be calculated in any appropriate manner without departing from the spirit and scope of the present invention as long as the calculated code-ID 22 is in a form expected to be seen by the RP 10.

Thus, at some point during the operation of the RR 14, such RR 14 indeed requires the resource 12 from the RP 10 and therefore requests the authenticator 16 to obtain such resource 12 on behalf of the RR 14 (step 311). Note that before so attempting to obtain such resource 12, the authenticator 16 may perform various authentication functions with respect to the RR 14 to ascertain that the RR 14 has rights to the resource 12 and is to be trusted with the resource 12, among other things (step 313). In doing so, the authenticator 16 may itself refer to the security-related information in the id 20 corresponding to the RR 14, and may also confirm that the RR 14 has not been modified in any manner including that which would negate trust thereof, among other things. In general, the authenticator 16 may perform any authentication functions with respect to the RR 14 without departing from the spirit and scope of the present invention. Such authentication functions are known or should be apparent to the relevant public and therefore need not be set forth herein in any detail.

Presuming that the authenticator 16 is satisfied with the RR 14, then, the authenticator 16 forwards the request for the resource 12 from the RR 14 to the RP 10 (step 315). Such forwarded request may be a verbatim copy of the request from the RR 14 or a modification thereof. Thus, the forwarded request may take any appropriate form without departing from the spirit and scope of the present invention. For example, such form may be as a pre-defined quoting function that includes the calculated code-ID 22 for the requesting RR 14, the id 20 for the requesting RR 14, and a definition of the resource 12 requested by the RR 14, among other things. As should be appreciated, the quoting function may also include a digital signature or the like based on one or more of such items, where the signature is verifiable based on a security key shared between the authenticator 16 and the RP 10.

Figure 4:
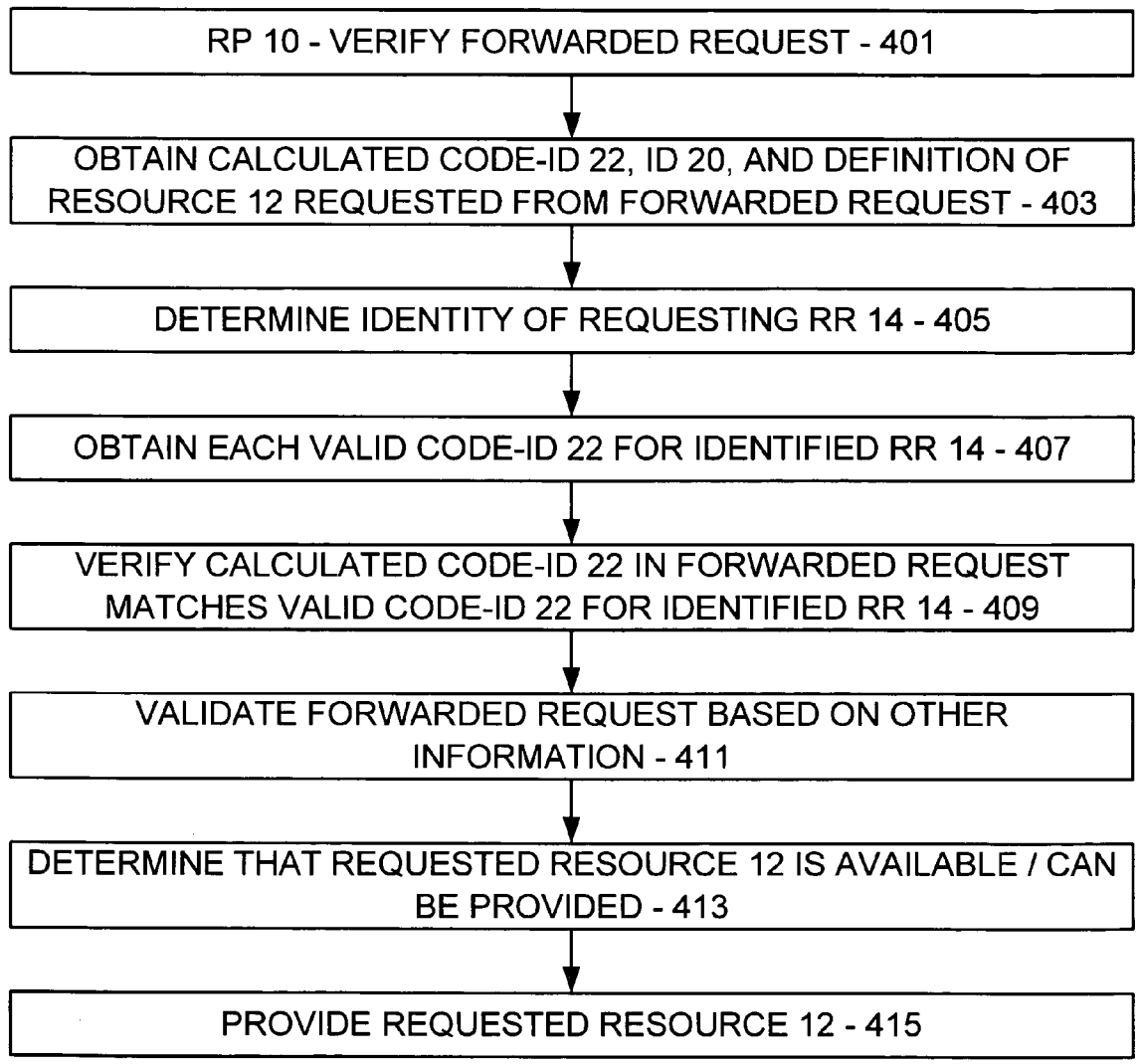
FIG. 4 is a flow diagram showing key steps performed by the resource provider of FIG. 2 in providing a resource to the resource recipient of FIG. 2 in accordance with one embodiment of the present invention.

In response to the received quoting function or other forwarded request, then, and turning now to FIG. 4, the RP 10 decides whether to in fact honor the request from the RR 14 for the resource. In particular, the RP 10 among other things verifies the forwarded request (step 401) which in the case of the quoting function includes verifying the signature thereof based on the shared security key. In addition, the RP 10 obtains the code-ID 22, the id 20, and the definition of the resource 12 requested from the forwarded request (step 403), determines from the forwarded request the identity of the requesting RR 14 (step 405), obtains each valid code-ID 22 for the identified RR 14 (step 407), and verifies that the calculated code-ID 22 in the forwarded request matches one of the valid code-IDs 22 for the identified RR 14 (step 409).

Note that the RP10 may determine the identity of the requesting RR 14 from the forwarded request by any appropriate manner without departing from the spirit and scope of the present invention. For example, such identity may be specified within the id 20 in the forwarded request as a particular name-value pair. Of course, a nefarious entity may alter such identity information in the id 20 in an attempt to inappropriately gain a resource 12 from the RP 10. However, because the code-ID 22 as calculated by the authenticator 16 is based in part on the id 20, such calculated code-ID should fail to match any valid code-ID known to the RP 10. In addition, it is to be noted that the authenticator 16 is trusted by the RP 10 to act appropriately and therefore is trusted to not subvert the code-ID 22.

Note, too, that the RP 10 is presumed and expected to have each valid code-ID 22 for the RR 14. Again, each of one or more valid code-IDs 22 of an RR 14 should be well-known, especially by an RP 10 which is to be asked to provide a resource 12 to the RR 14. Note, finally, that by finding a valid code-ID 22 in a forwarded request, the RP 10 can conclude based on the valid code-ID 22, which is derived from the RR 14 and the id 20 thereof, that the RR 14 can be trusted as being a known non-altered RR 14 that can be presumed to be trustworthy, and also that the security-related information upon which the RR 14 operates is known non-altered security-related information that can be presumed to be trustworthy. Moreover, it is to be appreciated that by employing code-IDs 22, a particular RR 14 that has been compromised can be dishonored merely by removing all relevant code-IDs thereof from being available to the RP 10.

In addition to validating the calculated code-ID 22 of the request, the RP 10 may also validate the forwarded request based on other information therein (step 411). For example, even if the code-ID 22 validates, the RP 10 may be programmed to honor or refuse the request based on certain information in the id 20, such as for example whether the RR 14 operates in an isolated process. Likewise, if the forwarded request includes an identification of a user of the computing device 18 of the RR 14, the RP 10 may be programmed to honor or refuse the request based on the identified user. Of course, the RP 10 may validate the forwarded request based on any criteria without departing from the spirit and scope of the present invention.

If the forwarded request is validated as at steps 409 and 411, the RP 10 then determines that the requested resource 12 is available and/or can be provided (step 413). For example, if the resource 12 is data, the RP 10 determines that the data is in fact available, or if the resource is access to a printer, the RP 10 determines that the printer is in fact on-line, has paper, and is accepting new print requests, among other things.

Presuming, then, that the forwarded request is validated as at steps 409 and 411 and the requested resource 12 is available and/or can be provided as at step 413, the RP 10 responds to the forwarded request by providing the requested resource 12 (step 415). Thus, if the resource 12 is an object, the RP 10 provides such object, and if the resource 12 is access to a service, the RP 10 arranges such access such as for example by way of a security key or other indicia of access and provides the security key or other indicia of access.

Such response with the requested resource 12 as provided by the RP 10 is received by the RR 14 (step 317, FIG. 3), either directly or indirectly by way of the authenticator 16, and the RR 14 may then employ the resource 12 provided the response as appropriate (step 319). Implicitly at least, because the RP 10 did in fact provide the requested resource 12 to the RR 14, the RR 14 and the computing device thereof are trusted by the RP 10 to employ the provide resource 12 only in a manner consistent with such trust, and especially in accordance with the security-related information set forth in the id 20 corresponding to the RR 14.

Conclusion

The present invention may be practiced with regard to any resource requesters RR 14 and providers RP 10. More concretely, the present invention for example could be used to enable a word processor at a PC to receive a protected word processing document, a music player at a dedicated playing device to transmit rendered music to a speaker system, a wireless device to access a local wireless network, and the like. Accordingly, the RR 14 is to be interpreted as any device requesting a resource 12 and the RP 10 is to be interpreted as any device providing a resource 12 within a system where the RR 14 operates based on security-related information in an id 20 and the RP 10 validates the trustworthiness of the RR 14 based in part on the id 20.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which a computer program, executable, or other resource recipient RR 14 can be provided with authentication information such as an id 20 by which the RR 14 can be authenticated by a resource provider RP 10 that is to provide a resource 12 thereto. The id 20 describes the identity of the RR 14 to the RP 10, and includes among other things a set of variables that describe the environment of the RR 14.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method of obtaining an electronic resource from a resource provider (RP) for a resource requester (RR) operating on a computing device, the RP and the RR residing on separate computing devices, the RP being a software or hardware electronics construct providing the resource, the RR having an identity descriptor (id) associated therewith, the id including security-related information specifying an environment in which the RR operates, the method comprising:

loading the RR onto the computing device;

loading the id corresponding to the RR onto the computing device;

providing the RR with a reference to the loaded id;

calculating a code identity (code-ID) corresponding to and based on the loaded RR and loaded id;

receiving at an authenticator separate from the RR and the RP a request from the RR for the resource;

ascertaining at the authenticator that the requesting RR has rights to the resource and is to be trusted with the resource;

forwarding, by the authenticator the request for the resource from the RR to the RP, the forwarded request including the calculated code-ID for the requesting RR, the id for the requesting RR, and a definition of the resource requested by the RR, the RP verifying that the calculated code-ID in the forwarded request matches one of one or more valid code-IDs for the identified RR, concluding based thereon that the RR can be trusted as being a known RR that can be presumed to be trustworthy, and also that the security-related information upon which the RR operates is known security-related information that can be presumed to be trustworthy, and responding to the forwarded request by providing the requested resource only upon so concluding;

receiving, by the RR, the requested resource as provided by the RP, and employing same in a manner consistent with the trust imparted to the RR by the RP, and in accordance with the security-related information set forth in the id corresponding to the RR.

2. The method of claim 1 wherein, the authenticator refers to the security-related information in the id corresponding to the RR.

3. The method of claim 1 wherein the forwarded request further includes a digital signature based on at least one of the calculated code-ID for the requesting RR, the id for the requesting RR, and the definition of the resource requested by the RR, the signature being verifiable based on a security key shared with the RP.

4. The method of claim 1 wherein the id includes therein a set of security-related name-value pairs available as input to at least one of the RR, the RP, and an operating system on the computing device upon which the RR operates.

5. The method of claim 4 wherein the name-value pairs describe at least one of the environment within which the RR operates, whether the RR is to be operated in an isolated process, and each entry point by which the RR can be accessed.

6. The method of claim 1 wherein the code-ID is calculated from a digest of the RR and the id.

7. The method of claim 6 wherein the code-ID is a hash of the RR concatenated with the id thereof.

8. The method of claim 7 wherein the code-ID is a concatenation of two hashes, each hash being of the RR concatenated with the id thereof.

9. A method of providing an electronic resource by a resource provider (RP) to a resource requester (RR) operating on a computing device, the RP being a software or hardware electronic construct providing the resource, the RR having an identity descriptor (id) associated therewith, the id including security-related information specifying an environment in which the RR operates, the method comprising:

receiving a forwarded request from the RR for the resource by way of an authenticator separate from the RR and the RP, the authenticator having ascertained that the requesting RR has rights to the resource and is to be trusted with the resource, the forwarded request including a code identity (code-ID) calculated for the requesting RR, the calculated code-ID corresponding to and based on the RR and the id as loaded on the computing device, the forwarded request also including the id for the requesting RR and a definition of the resource requested by the RR;

verifying the received request;

obtaining the code-ID, the id, and the definition of the resource requested from the received request;

determining from the received request an identity of the requesting RR;

obtaining each of one or more valid code-IDs for the identified RR;

verifying that the calculated code-ID in the received request matches one of one or more valid code-IDs for the identified RR and concluding based thereon that the RR can be trusted as being a known RR that can be presumed to be trustworthy, and also that the security-related information upon which the RR operates is known security-related information that can be presumed to be trustworthy;

responding to the forwarded request by providing the requested resource to the RR only upon so concluding, the RR receiving the requested resource as provided by the RP and employing same in a manner consistent with the trust imparted to the RR by the RP, and in accordance with the security-related information set forth in the id corresponding to the RR.

10. The method of claim 9 wherein, the authenticator refers to the security-related information in the id corresponding to the RR.

11. The method of claim 9 wherein the forwarded request further includes a digital signature based on at least one of the calculated code-ID for the requesting RR, the id for the requesting RR, and the definition of the resource requested by the RR, the method further comprising verifying the signature.

12. The method of claim 9 further comprising validating the forwarded request based on other information therein.

13. The method of claim 9 further comprising determining that the requested resource is available and/or can be provided.

14. The method of claim 9 wherein the id includes therein a set of security-related name-value pairs available as input to at least one of the RR, the RP, and an operating system on the computing device upon which the RR operates.

15. The method of claim 14 wherein the name-value pairs describe at least one of the environment within which the RR operates, whether the RR is to be operated in an isolated process, and each entry point by which the RR can be accessed.

16. The method of claim 9 wherein the code-ID is calculated from a digest of the RR and the id.

17. The method of claim 16 wherein the code-ID is a hash of the RR concatenated with the id thereof.

18. The method of claim 17 wherein the code-ID is a concatenation of two hashes, each hash being of the RR concatenated with the id thereof.

19. A computer-readable medium having stored thereon computer-executable instructions for performing a method of obtaining an electronic resource from a resource provider (RP) for a resource requester (RR) operating on a computing device, the RP being a software or hardware electronic construct providing the resource, the RR having an identity descriptor (id) associated therewith, the id including security-related information specifying an environment in which the RR operates, the method comprising:

loading the RR onto the computing device;
loading the id corresponding to the RR onto the computing device;
providing the RR with a reference to the loaded id;
calculating a code identity (code-ID) corresponding to and based on the loaded RR and loaded id;
receiving at an authenticator separate from the RR and the RP a request from the RR for the resource;
ascertaining at the authenticator that the requesting RR has rights to the resource and is to be trusted with the resource;
forwarding, by the authenticator, the request for the resource from the RR to the RP, the forwarded request including the calculated code-ID for the requesting RR, the id for the requesting RR, and a definition of the resource requested by the RR, the RP verifying that the calculated code-ID in the forwarded request matches one of one or more valid code-IDs for the identified RR, concluding based thereon that the RR can be trusted as being a known RR that can be presumed to be trustworthy, and also that the security-related information upon which the RR operates is known security-related information that can be presumed to be trustworthy, and responding to the forwarded request by providing the requested resource only upon so concluding;
receiving, by the RR, the requested resource as provided by the RP, and employing same in a manner consistent with the trust imparted to the RR by the RP, and in accordance with the security-related information set forth in the id corresponding to the RR.

20. The medium of claim 19 wherein, the authenticator refers to the security-related information in the id corresponding to the RR.

21. The medium of claim 19 wherein the forwarded request further includes a digital signature based on at least one of the calculated code-ID for the requesting RR, the id for the requesting RR, and the definition of the resource requested by the RR, the signature being verifiable based on a security key shared with the RP.

22. The medium of claim 19 wherein the id includes therein a set of security-related name-value pairs available as input to at least one of the RR, the RP, and an operating system on the computing device upon which the RR operates.

23. The medium of claim 22 wherein the name-value pairs describe at least one of the environment within which the RR operates, whether the RR is to be operated in an isolated process, and each entry point by which the RR can be accessed.

24. The medium of claim 19 wherein the code-ID is calculated from a digest of the RR and the id.

25. The medium of claim 24 wherein the code-ID is a hash of the RR concatenated with the id thereof.

26. The medium of claim 25 wherein the code-ID is a concatenation of two hashes, each hash being of the RR concatenated with the id thereof.

27. A computer-readable medium having stored thereon computer-executable instructions for performing a method of providing an electronic resource by a resource provider (RP) to a resource requester (RR) operating on a computing device, the RP being a software or hardware electronic construct providing the resource, the RR having an identity descriptor (id) associated therewith, the id including security-related information specifying an environment in which the RR operates, the method comprising:

receiving a forwarded request from the RR for the resource by way of an authenticator separate from the RR and the RP, the authenticator having ascertained that the requesting RR has rights to the resource and is to be trusted with the resource, the forwarded request including a code identity (code-ID) calculated for the requesting RR, the calculated code-ID corresponding to and based on the RR and the id as loaded on the computing device, the forwarded request also including the id for the requesting RR and a definition of the resource requested by the RR;
verifying the received request;
obtaining the code-ID, the id, and the definition of the resource requested from the received request;
determining from the received request an identity of the requesting RR;
obtaining each of one or more valid code-IDs for the identified RR;
verifying that the calculated code-ID in the received request matches one of one or more valid code-IDs for the identified RR and concluding based thereon that the RR can be trusted as being a known RR that can be presumed to be trustworthy, and also that the security-related information upon which the RR operates is known security-related information that can be presumed to be trustworthy;
responding to the forwarded request by providing the requested resource to the RR only upon so concluding, the RR receiving the requested resource as provided by the RP and employing same in a manner consistent with the trust imparted to the RR by the RP, and in accordance with the security-related information set forth in the id corresponding to the RR.

28. The medium of claim 27 wherein, the authenticator refers to the security-related information in the id corresponding to the RR.

29. The medium of claim 27 wherein the forwarded request further includes a digital signature based on at least one of the calculated code-ID for the requesting RR, the id for the requesting RR, and the definition of the resource requested by the RR, the method further comprising verifying the signature.

30. The medium of claim 27 wherein the method further comprises validating the forwarded request based on other information therein.

31. The medium of claim 27 wherein the method further comprises determining that the requested resource is available and/or can be provided.

32. The medium of claim 27 wherein the id includes therein a set of security-related name-value pairs available as input to at least one of the RR, the RP, and an operating system on the computing device upon which the RR operates.

33. The medium of claim 32 wherein the name-value pairs describe at least one of the environment within which the RR operates, whether the RR is to be operated in an isolated process, and each entry point by which the RR can be accessed.

34. The medium of claim 27 wherein the code-ID is calculated from a digest of the RR and the id.

35. The medium of claim 34 wherein the code-ID is a hash of the RR concatenated with the id thereof.

36. The medium of claim 35 wherein the code-ID is a concatenation of two hashes, each hash being of the RR concatenated with the id thereof.

* * * * *

UNITED STATES PATENT AND TRADEMARK OFFICE
CERTIFICATE OF CORRECTION

| | | |
|---|---|---|
| PATENT NO. | : 7,418,512 B2 | Page 1 of 1 |
| APPLICATION NO. | : 10/692224 | |
| DATED | : August 26, 2008 | |
| INVENTOR(S) | : Paul England et al. | |

It is certified that error appears in the above-identified patent and that said Letters Patent is hereby corrected as shown below:

In column 11, line 1, in Claim 1, delete "electronics" and insert -- electronic --, therefor.

In column 11, line 16, in Claim 1, after "authenticator" insert -- , --.

Signed and Sealed this
Third Day of May, 2011

David J. Kappos
*Director of the United States Patent and Trademark Office*